(12) United States Patent
Nevo et al.

(10) Patent No.: US 6,928,266 B1
(45) Date of Patent: *Aug. 9, 2005

(54) WIRELESS APPARATUS INTERFERENCE AVOIDANCE/RESOLUTION METHOD AND APPARATUSES

(75) Inventors: Ron Nevo, Hillsboro, OR (US); Ephraim Zehavi, Haifa (IL); Brett A. Monello, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,215

(22) Filed: Nov. 12, 1999

(51) Int. Cl.[7] .............................. H04B 1/00; H04B 15/00
(52) U.S. Cl. ........................ 455/63.3; 455/63.1; 455/88; 370/278
(58) Field of Search .............................. 455/63.1, 63.3, 455/552.1, 553.1, 88, 41.2, 426.1, 63.2, 423; 370/338, 278, 281, 497, 282, 286, 290, 343, 480

(56) References Cited

U.S. PATENT DOCUMENTS

| | | | | |
|---|---|---|---|---|
| 5,117,377 A | * | 5/1992 | Finman | ........................ 703/2 |
| 5,299,228 A | * | 3/1994 | Hall | ........................ 370/335 |
| 5,754,947 A | | 5/1998 | Tanabe et al. | |
| 5,852,405 A | | 12/1998 | Yoneda et al. | |
| 5,875,186 A | | 2/1999 | Belanger et al. | |
| 6,275,518 B1 | * | 8/2001 | Takahashi et al. | .......... 375/135 |
| 6,600,726 B1 | * | 7/2003 | Nevo et al. | .................. 370/278 |

FOREIGN PATENT DOCUMENTS

| | | | |
|---|---|---|---|
| EP | 0 812 069 | 6/1997 | |
| WO | WO 99 16266 | 4/1999 | |
| WO | WO 99/19126 | * 6/1999 | ............ H04Q/7/22 |
| WO | WO 99/29126 | 6/1999 | |

* cited by examiner

*Primary Examiner*—Vivian Chin
*Assistant Examiner*—Lewis West
(74) *Attorney, Agent, or Firm*—James S. Finn

(57) ABSTRACT

A wireless device is provided with a wireless transceiver to transmit and receive signals in accordance with a first protocol to and from network devices of a first wireless network, and a controller manager to control operation of the wireless transceiver. The wireless device is further provided with a wireless receiver to receive signals transmitted in accordance with a second protocol by network devices of a second wireless network, and the controller manager is equipped to control operation of the wireless transceiver based at least in part on at least one signaling characteristic of the received signals from network devices of the second wireless network, to reduce interference with proximately located ones of the network devices of the second wireless network. In various embodiments, the controller manager suspends operation of the wireless transceiver whenever interference is predicted. In other embodiments, the controller manager causes an appropriate filter to be applied whenever interference is predicted.

30 Claims, 9 Drawing Sheets

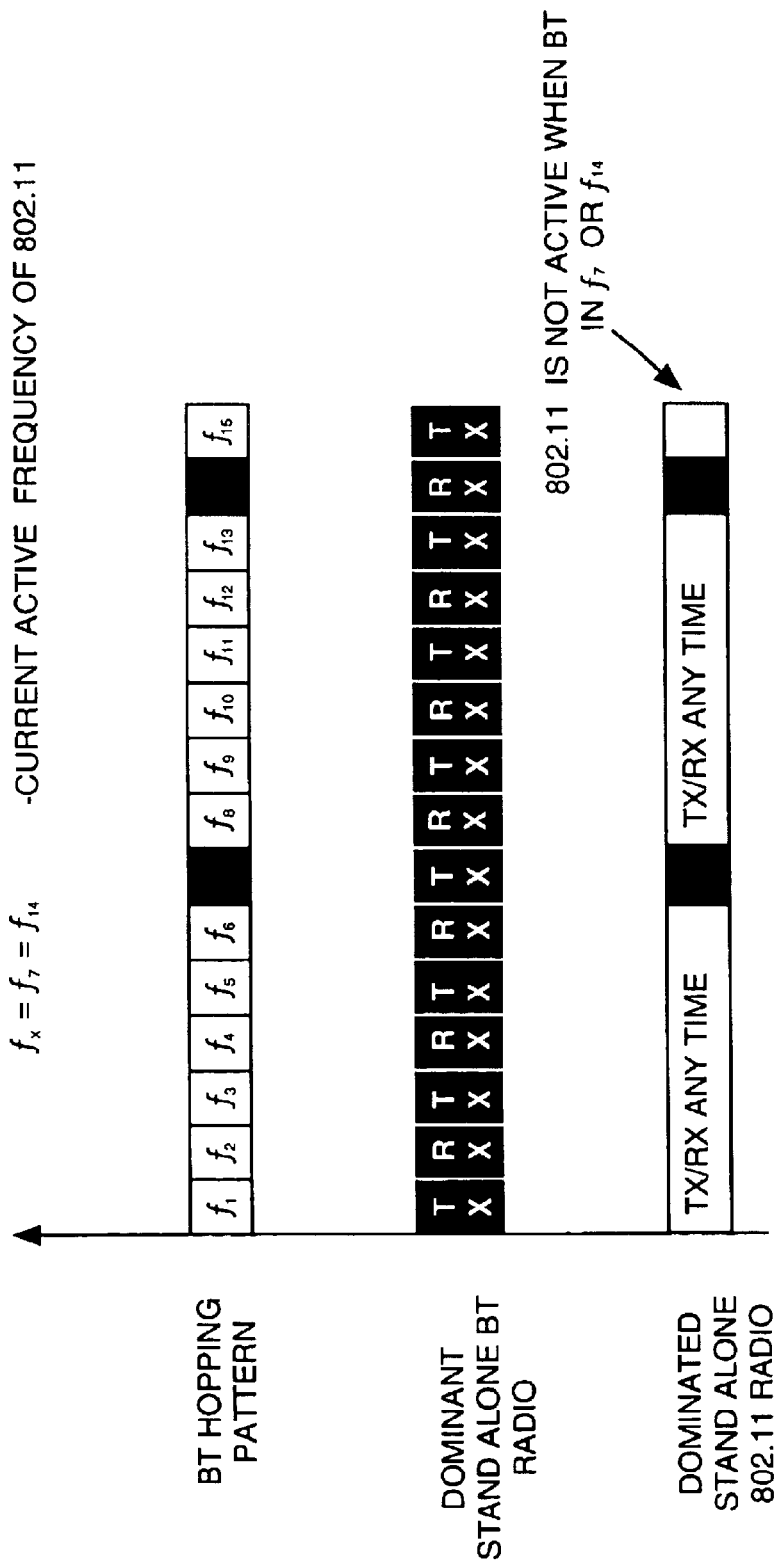

WIRELESS APPARATUS INTERFERENCE AVOIDANCE/RESOLUTION METHOD AND APPARATUSES

BACKGROUND OF THE INVENTION

1. Field of the Invention

The present invention relates to the field of wireless communication. More specifically, the present invention relates to the problem of concurrent wireless communication with multiple communication partners of different wireless communication protocols.

2. Background Information

Advances in microprocessor and communication technology have led to the increase in popularity of wireless communication. Once confined to the privileged, wireless voice communication have become affordable and available to the masses. Today, various efforts are under way to apply wireless communication to replace attachment cables used for attaching peripheral devices, such as printers, scanners and the like, as well as networking cables used for connecting clients, servers and the like. A leading candidate to accomplish the former is commonly known to those skilled in the art as the Bluetooth technology or Bluetooth protocol. Examples of technology to accomplish the later include the different variants of the IEEE 802.11 Standard published by the Institute of Electrical and Electronic Engineers, 802.11, (Frequency Hopping, Direct Sequence), 802.11a, 802.11b, as well as Home RF, also known as Shared Wireless Access Protocol (SWAP) to those skilled in the art.

It is desirable for various applications to have wireless devices that operate in accordance with different protocols, and overlapping frequencies, to operate proximately located to each other. Most wireless protocols employ carrier sense collision detection, and random back off to resolve collision or interference. However, experience has shown that prior art collision detection and back off approaches could substantially degrade the performance of both networks operating with overlapping frequencies. Accordingly, an improved approach to allow wireless devices operating with different protocols and overlapping frequencies to operate proximately close to each other is needed.

SUMMARY OF THE INVENTION

A wireless device is provided with a wireless transceiver to transmit and receive signals in accordance with a first protocol to and from network devices of a first wireless network, and a controller manager to control operation of the wireless transceiver. The wireless device is further provided with a wireless receiver to receive signals transmitted in accordance with a second protocol by network devices of a second wireless network, and the controller manager is equipped to control operation of the wireless transceiver based at least in part on at least one signaling characteristic of the received signals from network devices of the second wireless network, to reduce interference with proximately located ones of the network devices of the second wireless network.

In various embodiments, the controller manager suspends operation of the wireless transceiver whenever interference is predicted. In other embodiments, the controller manager causes an appropriate filter to be applied whenever interference is predicted.

BRIEF DESCRIPTION OF DRAWINGS

The present invention will be described by way of exemplary embodiments, but not limitations, illustrated in the accompanying drawings in which like references denote similar elements, and in which:

FIGS. 2a–2c illustrate a period of operation of the wireless devices of FIG. 1, in accordance with each of three embodiments;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
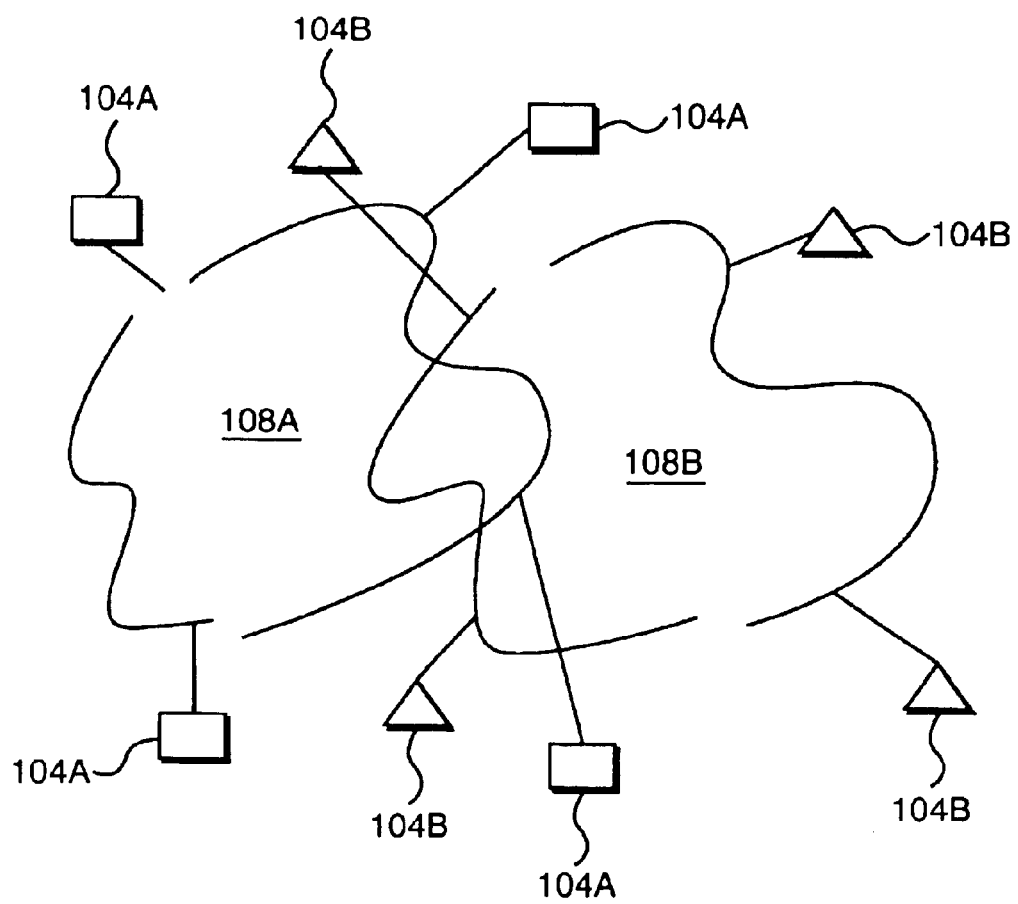
FIG. 1 illustrates an overview of an overlapping wireless network environment incorporated with the teaching of the present invention.

Referring now to FIG. 1, wherein an overview of an overlapping network environment incorporated with the teachings of the present invention is shown. As illustrated, overlapping wireless network environment 100 includes wireless network devices 104a of first wireless network 108a operating in accordance with a first wireless protocol, and wireless network devices 104b of second wireless network 108b operating in accordance with a second wireless protocol. Wireless devices 104a and 104b are proximately located to each other, with at least some of wireless devices 104a and 104b being sufficiently close, such that when they transmit on the same frequency, they interfere (or "collide") with each other. In accordance with the present invention, one or more wireless devices 104a and 104b are incorporated with the teachings of the present invention, to facilitate pro-active interference avoidance or resolution. As a result, the amount of collision and the number of times wireless devices 104a and 104b have to go through the costly prior art back off, retry approaches are reduced, leading to overall improvement in efficiency for both wireless networks 108a–108b.

In one embodiment, all devices 104a are incorporated with the teachings of the present invention to predict when an interference will occur, and either proactively avoid or resolve the interference (hereinafter, "fully enhanced" devices). In another embodiment, only some of devices 104a are so enhanced (one or more). In yet another embodiment, while only some of devices 104a are so enhanced (one or more), other devices 104a not so "enhanced" are nevertheless "minimally enhanced" to request the "fully enhanced" devices 104a to at least preemptively notify them on when an interference is predicted to occur (hereinafter, "minimally enhanced" devices). The "Fully enhanced" devices 104a are further equipped to provide the preemptive notifications.

Likewise, in one embodiment, all devices 104b are incorporated with the teachings of the present invention to predict when an interference will occur, and either proactively avoid or resolve interference (hereinafter, "fully enhanced" devices). In another embodiment, only some of devices 104b are so enhanced. In yet another embodiment, while only some of devices 104b are so enhanced, other devices 104b not so enhanced are nevertheless "minimally" enhanced to request the "fully enhanced" devices 104b to at least preemptively notify them on when interference is predicted to occur (hereinafter, "minimally enhanced" devices). The "fully enhanced" devices 104b are further equipped to provide the preemptive notifications.

Figure 2B:
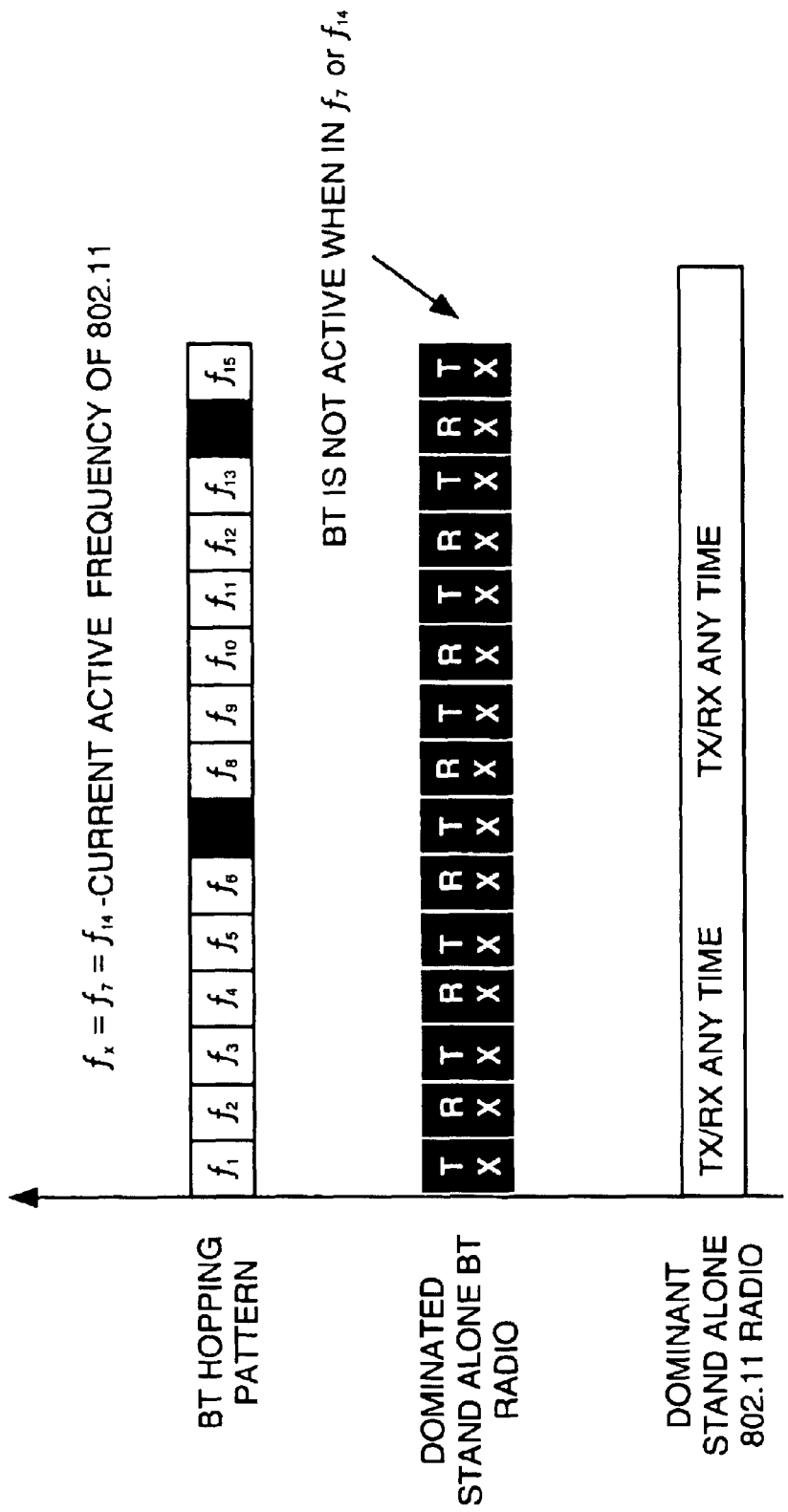
Figure 2C:
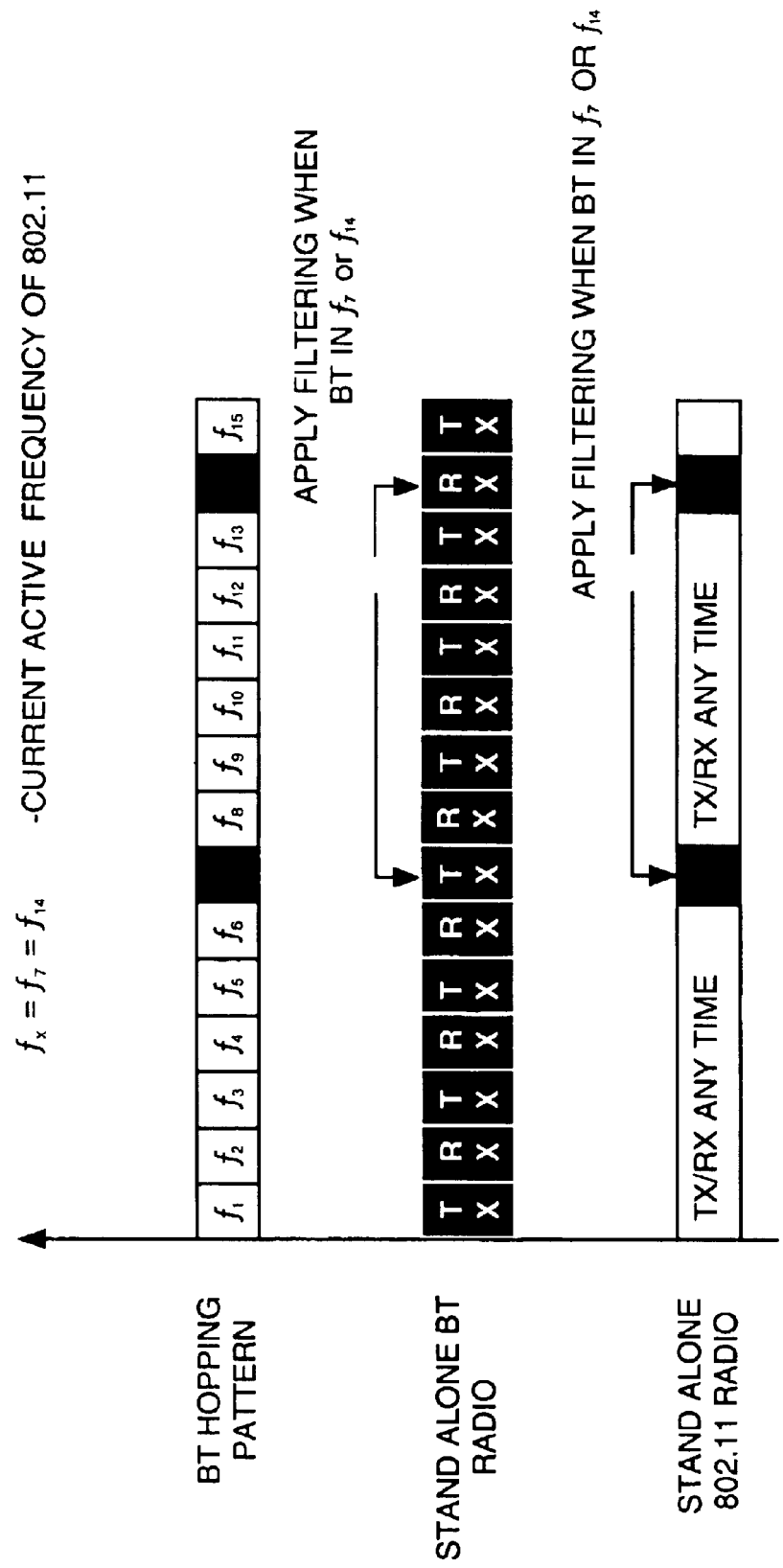

Referring now to FIGS. 2a–2c, wherein a period of operation for the wireless devices of FIG. 1 in accordance with each of three alternate embodiments are shown. In each of these three alternate embodiments, first protocol of wireless devices 104a of wireless network 108a is assumed to be a frequency hopping protocol having a number of frequencies as shown, i.e. wireless devices 104a hop from frequency to frequency in accordance with a pseudo random pattern to transmit signals. For ease of understanding, second protocol of wireless devices 104b of network 108b is assumed to be a constant frequency protocol (although in alternate embodiments, it may also be a frequency hopping protocol). In any event, to illustrate the present invention, at least one of the frequencies of the first protocol is the same frequency of the second protocol. Thus, if some of devices 104a and 104b are located sufficiently close to each other, and when one of devices 104a selects the same frequency for transmission, interference (or collision) between these devices will occur, resulting in one or more transmission failures. For the illustrated example, frequency interference (or collision) is shown to occur at the $7^{th}$ and $14^{th}$ hop ($f_7$ and $f_{14}$). That is, in accordance with the pseudo random pattern, in each of these two hops, devices 104a transmit in the same frequency employed by devices 104b. An example of a frequency hopping protocol is the Bluetooth protocol, and an example of a protocol having an interfering frequency with Bluetooth is the 802.11 protocol. [Note that the example interference at the $7^{th}$ and $14^{th}$ hop is not intended to suggest that the interference occurs at every $7^{th}$ hop. The interference pattern is dictated by the intersection of the pseudo random pattern followed by the frequency hopping devices 104a and the frequency employed by devices 104b.]

In one embodiment, at least some of wireless devices 104a and/or wireless devices 104b are enhanced to proactively avoid interference (either "fully", or "minimally" as described earlier). The enhanced wireless devices 104a/104b voluntarily let the other devices 104b/104a be the "dominant" devices. That is, they voluntarily behave as the dominated devices. As the dominated devices, they voluntarily suspend operation (for a brief moment), whenever interference is predicted to occur, to pro-actively avoid interference with the dominant devices. As a result, the dominant devices may operate without being interfered with.

In another embodiment, at least some of wireless devices 104a and/or wireless devices 104b are enhanced to pro-actively resolve interference (either "fully" or "minimally" as described earlier). The enhanced wireless devices 104a/104b apply appropriate corresponding filters, whenever interference is predicted to occur, to remove the corresponding interfering signals. As a result, interference is proactively resolved.

Thus, in either of these embodiments, the time consuming collision detection, back off and retries (to resolve interference) are substantially reduced. Experience has shown that the overall operating efficiencies of both networks improve, even in the case where one is a dominant network and the other is a dominated network.

FIG. 2a illustrates a period of operation where only wireless devices 104b (all or selected ones) are enhanced to be the voluntary dominated devices ("fully" or "minimally", as described earlier), allowing wireless devices 104a, the frequency hopping devices, to be the dominant devices. FIG. 2b illustrates a period of operation where only wireless devices 104a (all or selected ones) are enhanced to be the voluntary dominated devices ("fully" or "minimally", as described earlier), allowing wireless devices 104b to be the dominant devices. FIG. 2c illustrates a period of operation where wireless devices 104a and/or 104b (all or selected ones) are enhanced to apply appropriate corresponding filters ("fully" or "minimally", as described earlier), whenever interference is predicted to occur, to remove the corresponding interfering signals. Thus, as illustrated, under FIG. 2a, enhanced ones of wireless devices 104b will voluntarily suspend operation (for a brief moment) at example interference hops $f_7$, $f_{14}$ and so forth, to pro-actively avoid interference. Whereas under FIG. 2b, enhanced ones of wireless devices 104a will voluntarily suspend operation (for a brief moment), at example interference hops $f_7$, $f_{14}$ and so forth, to pro-actively avoid interference. Under FIG. 2c, enhanced ones of wireless devices 104a/104b will apply the appropriate corresponding filters (for a brief moment) at example interference hops $f_7$, $f_{14}$ and so forth, to pro-actively resolve interference.

Figure 3A:
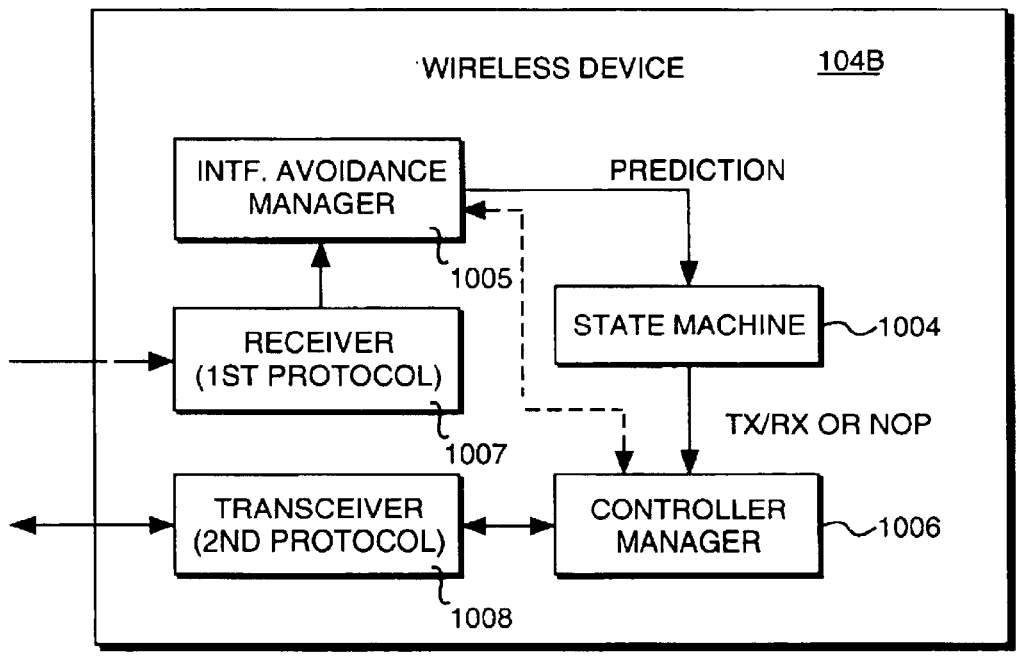
FIGS. 3a–3b illustrate an architectural view and operation flow of "fully" enhanced wireless devices 104b of FIG. 1 in further detail, in accordance with one implementation.
Figure 3B:
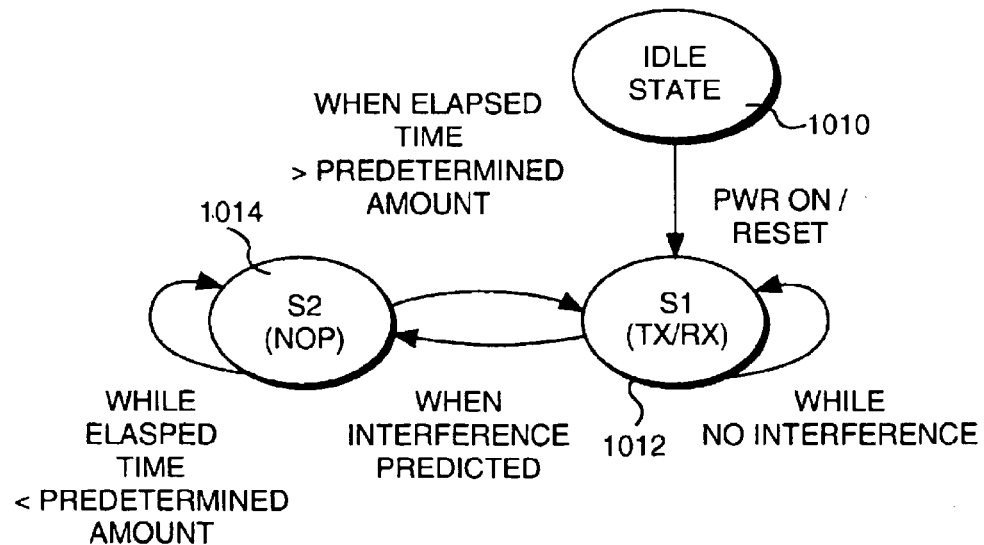

FIGS. 3a–3b illustrate the architecture and operational flow of an enhanced wireless device 104b of FIG. 1 for practicing the method of operation of FIG. 2b, in accordance with one embodiment (a "fully enhanced" embodiment). As described earlier, under the embodiment of FIG. 2b, wireless devices 104b are enhanced to be the voluntary dominated devices, allowing wireless devices 104a to be the dominant devices, to proactively avoid interference. Enhanced wireless devices 104b are to predict when an interference will occur, and at each of such predicted occurrence, voluntarily suspend operation (for a brief moment) to proactively refrain from interfering with wireless devices 104a.

As illustrated in FIG. 3a, to enable wireless devices 104b to so operate, each wireless device 104b, in addition to conventional transceiver 1008 and controller manager 1006, is additionally provided with state machine 1004, receiver 1007 and interference avoidance manager 1005. The elements are coupled to each other as shown.

Receiver 1007 is used to additionally receive signals transmitted in accordance with the first protocol between wireless devices 104a, thus allowing the enhanced wireless device 104b, to be able to receive signals in the first protocol, in addition to transmitting and receiving signals in the second protocol. Interference avoidance manager 1005 is equipped to determine at least a signaling characteristic of the first protocol, and predicts when an interference will occur, based on the determined one or more signal characteristics. For the illustrated embodiment, interference avoidance manager 1005 determines the pseudo random frequency hopping pattern followed by devices 104a, and predicts when an interference will occur based on the determined pseudo random frequency hopping pattern. The determination may be made in any one of a number of techniques known in the art.

State machine 1004 is used to periodically generate a TX/RX or NOP control signal for controller manager 1006 to control transceiver 1008 accordingly, i.e. to transmit/receive or suspend operation (to pro-actively avoid interference). State machine 1004 generates the TX/RX or NOP control signal based on whether an interference is predicted by interference avoidance manager 1005.

As illustrated in FIG. 3b, state machine 1004, in addition to idle state 1010, has two operating states (S1–S2) 1012–1014. In state S1, state machine 1004 outputs the TX/RX control signal denoting performance of transmit/receive operation, and in state S2, state machine 1004 outputs the NOP control signal denoting suspension of transmit/receive operation.

Upon power-on or reset, state machine 1004 transitions from idle state 1010 to S1 state 1012. While in S1 state 1012, state machine 1004 remains in the state as long as an interference is not predicted by interference avoidance manager 1005, outputting the TX/RX control signal for controller manager 1006. Whenever an interference is predicted by interference avoidance manager 1005, state machine 1004 transitions from S1 state 1012 to S2 state 1014. While in S2 state 1014, state machine 1004 remains in the state for a predetermined duration, outputting the NOP signal denoting suspension of transmit/receive operations for controller manager 1006. The predetermined duration may be "hardwired", denoted through jumpers, or set through configuration registers, and the like. Upon expiration of the predetermined duration, state machine 1004 transitions from S2 state 1014 to S1 state 1012. From S1 state 1012, state machine 1004 continues operation as described earlier.

Except for the generation of the TX/RX and NOP control signals, and the control of transceiver 1008 by controller manager 1006 in accordance with these control signals, pro-actively avoiding interference with wireless device 104a, each wireless device. 104b, including controller manager 1006 and transceiver 1008, otherwise operates as known in the art.

Referring again to FIG. 3a, in one embodiment, in support of the "minimally enhanced" devices 104b, interference avoidance manager 1005 further monitors signals received by transceiver 1008 from other devices 104b. In particular, interference avoidance manager 1005 monitors for requests from other "minimally enhanced" devices 104b to be preemptively notified of a predicted occurrence of an interference. Upon receiving at least one such request, interference avoidance manager 1005 further causes each prediction to be broadcast for other devices 104b, thereby allowing the "minimally enhanced" devices 104b to be able to voluntarily behave as dominated devices (in favor of wireless devices 104a, the dominant devices).

A "minimally enhanced" device 104b may be constituted by slightly modifying controller manager 1006, and additionally provided with only state machine 1007 (i.e., without providing receiver 1007 and interference manager 1005). Controller manager 1006 is slightly modified to broadcast a request to the "fully enhanced" devices 104b, to preemptively provide a prediction of interference, as described earlier. The broadcast e.g. may be made upon power on, reset, or periodically. State machine 1007 operates substantially as described earlier, i.e. outputting TX as long as no prediction of an interference occurrence is received, and outputting NOP for a predetermined duration whenever a prediction of an interference occurrence is received.

Figure 4A:
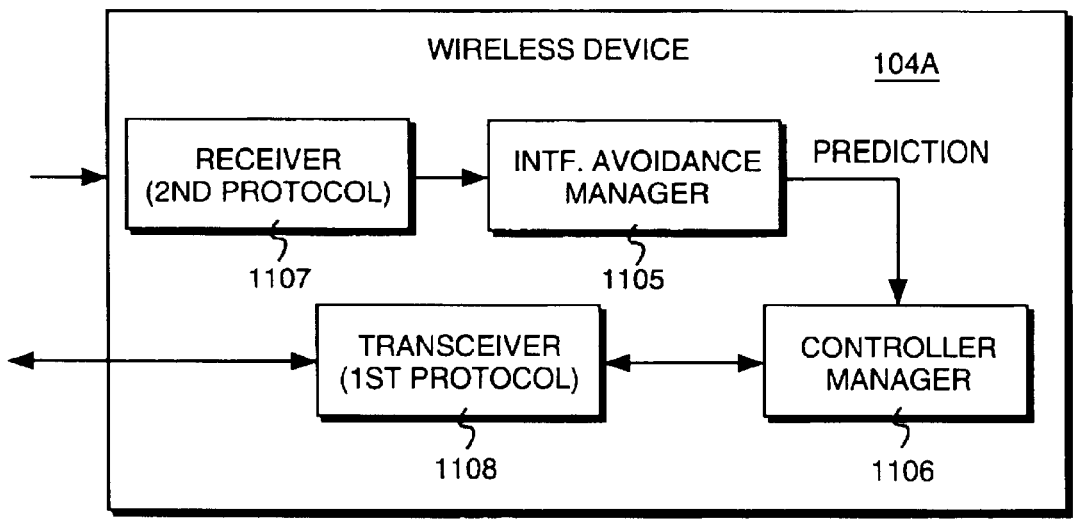
FIGS. 4a–4b illustrate an architectural view and operation flow of "fully" enhanced wireless devices 104a of FIG. 1 in further detail, in accordance with one implementation.
Figure 4B:
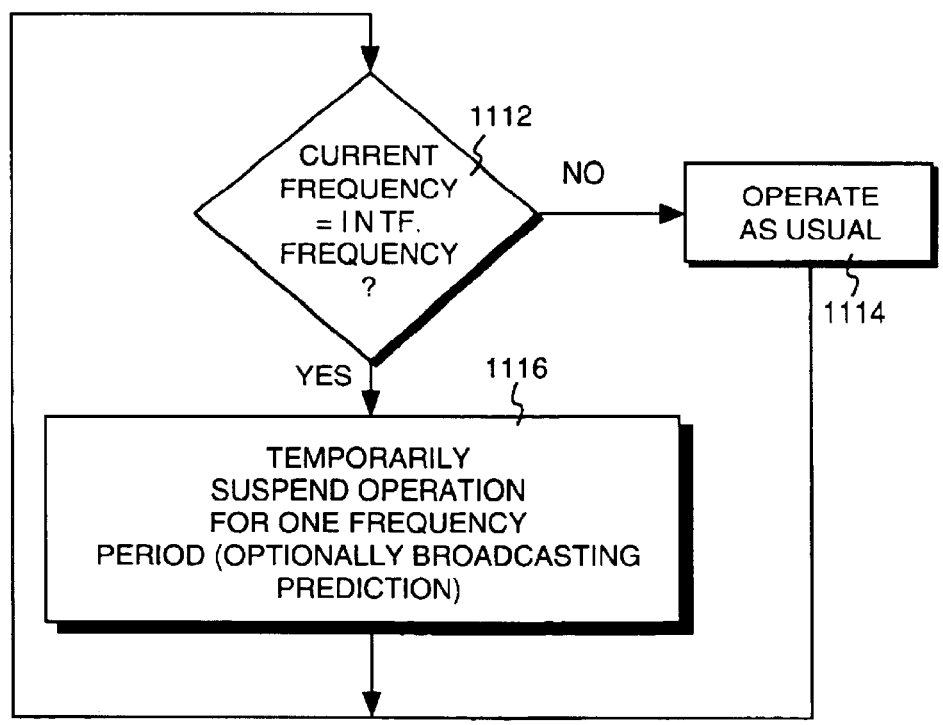

FIGS. 4a–4b illustrate the architecture and operational flow of an enhanced wireless device 104a of FIG. 1 for practicing the method of operation of FIG. 2a, in accordance with one embodiment (a "fully enhanced" embodiment). As described earlier, under the embodiment of FIG. 2a, wireless devices 104a are enhanced to be the voluntary dominated devices, allowing wireless devices 104b to be the dominant devices, to proactively avoid interference. Enhanced wireless devices 104a are to determine when a current frequency interferes with wireless device 104b, and at each of such determination (or "Prediction", albeit with certainty), voluntarily suspend operation (for a brief moment) to proactively refrain from interfering with wireless devices 104b.

As illustrated in FIG. 4a, to enable wireless devices 104a to so operate, each wireless device 104a, in addition to conventional transceiver 1108 and controller manager 1106, is additionally provided with receiver 1107 and interference avoidance manager 1105. The elements are coupled to each other as shown.

Receiver 1107 is used to additionally receive signals transmitted in accordance with the second protocol between wireless devices 104b, thus allowing the enhanced wireless device 104a, to be able to receive signals in the second protocol, in addition to transmitting and receiving signals in the first protocol Interference avoidance manager 1105 is equipped to determine at least a signaling characteristic of the second protocol, monitor controller manager 1106, determine if an interference is to occur based on the determined one or more signal characteristics, and proactively avoid the interference. For the illustrated embodiment, interference avoidance manager 1105 determines the signaling frequency of the second protocol, monitors the pseudo random frequency hopping pattern of controller manager 1106, and determines if a current frequency is the same as the signaling frequency of the second protocol.

As illustrated in FIG. 4b, interference avoidance manager 1105 checks for interference, as controller manager 1106 controls transceiver 1108, hopping from frequency to frequency, 1112. If the current frequency is not the interfering frequency, interference avoidance manager 1105 allows controller manager 1106 to operate transceiver 1108 as known in the art, 1114; otherwise, it causes controller manager 1106 to suspend transmit/receive operation, 1116, pro-actively avoiding interference.

Except for the inclusion of receiver 1107 and interference avoidance manager 1105, each wireless device 104a, including controller manager 1106 and transceiver 1108, otherwise operates as known in the art.

Referring again to FIG. 4a, in one embodiment, in support of the "minimally enhanced" devices 104a, interference avoidance manager 1105 further monitors signals received by transceiver 1108 from other devices 104a. In particular, interference avoidance manager 1105 monitors for requests from other "minimally enhanced" devices 104a to be preemptively notified of a "predicted" occurrence of an interference. Upon receiving at least one such request, interference avoidance manager 1105 further causes each prediction to be broadcast for other devices 104a, thereby allowing the "minimally enhanced" devices 104a to be able to voluntarily behave as dominated devices (in favor of wireless devices 104b, the dominant devices).

A "minimally enhanced" device 104a may be constituted by slightly modifying controller manager 1106 (i.e., without providing receiver 1107 and interference manager 1105). Controller manager 1106 is slightly modified to broadcast a request to "fully enhanced" devices 104a, to preemptively provide a prediction of interference, as described earlier. The broadcast may be made e.g. at power on, reset or periodically. Otherwise, controller manager 1107 operates substantially as described earlier, i.e. operating transceiver 1108 to transmit and receive signals as long as no prediction of an interference occurrence is received, and suspending operation of transceiver 1108 for a predetermined duration whenever a prediction of an interference occurrence is received.

Figure 5A:
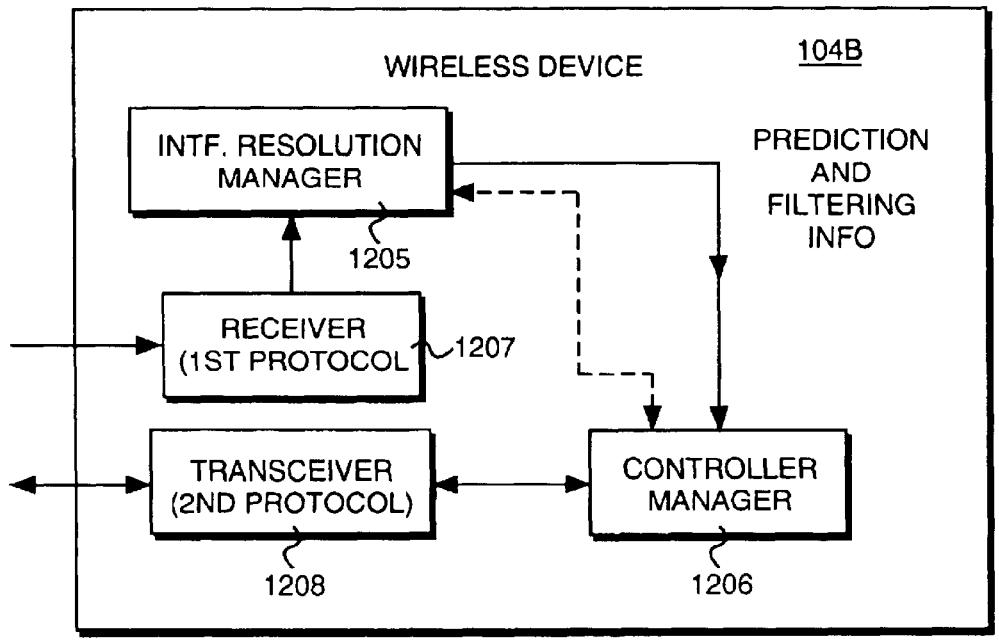
FIGS. 5a–5b illustrate an architectural view and operation flow of "fully" enhanced wireless devices 104b of FIG. 1 in further detail, in accordance with another implementation.
Figure 5B:
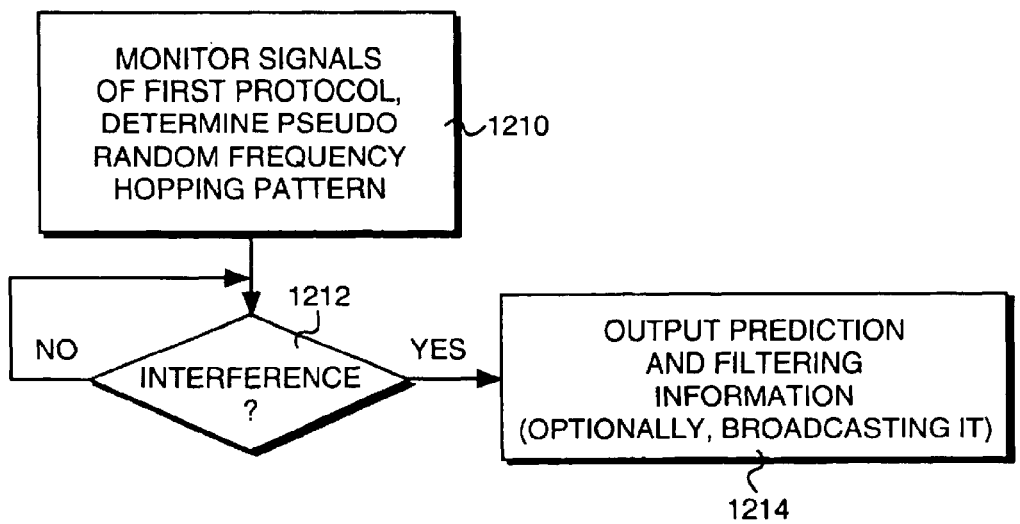

FIGS. 5a–5b illustrate the architecture and operational flow of an enhanced wireless device 104b of FIG. 1 for practicing the method of operation of FIG. 2c, in accordance with another embodiment (another "fully enhanced" embodiment). As described earlier, under the embodiment of FIG. 2c, wireless devices 104b are enhanced to proactively resolve interference. Enhanced wireless devices 104b are to predict when an interference will occur, and at each of such predicted occurrence, apply an appropriate filter (for a brief moment) to remove interfering signals of wireless devices 104a.

As illustrated in FIG. 5a, to enable wireless devices 104b to so operate, each wireless device 104b, in addition to conventional transceiver 1208 and controller manager 1206, is additionally provided with receiver 1207 and interference resolution manager 1205. The elements are coupled to each other as shown.

Figure 7:
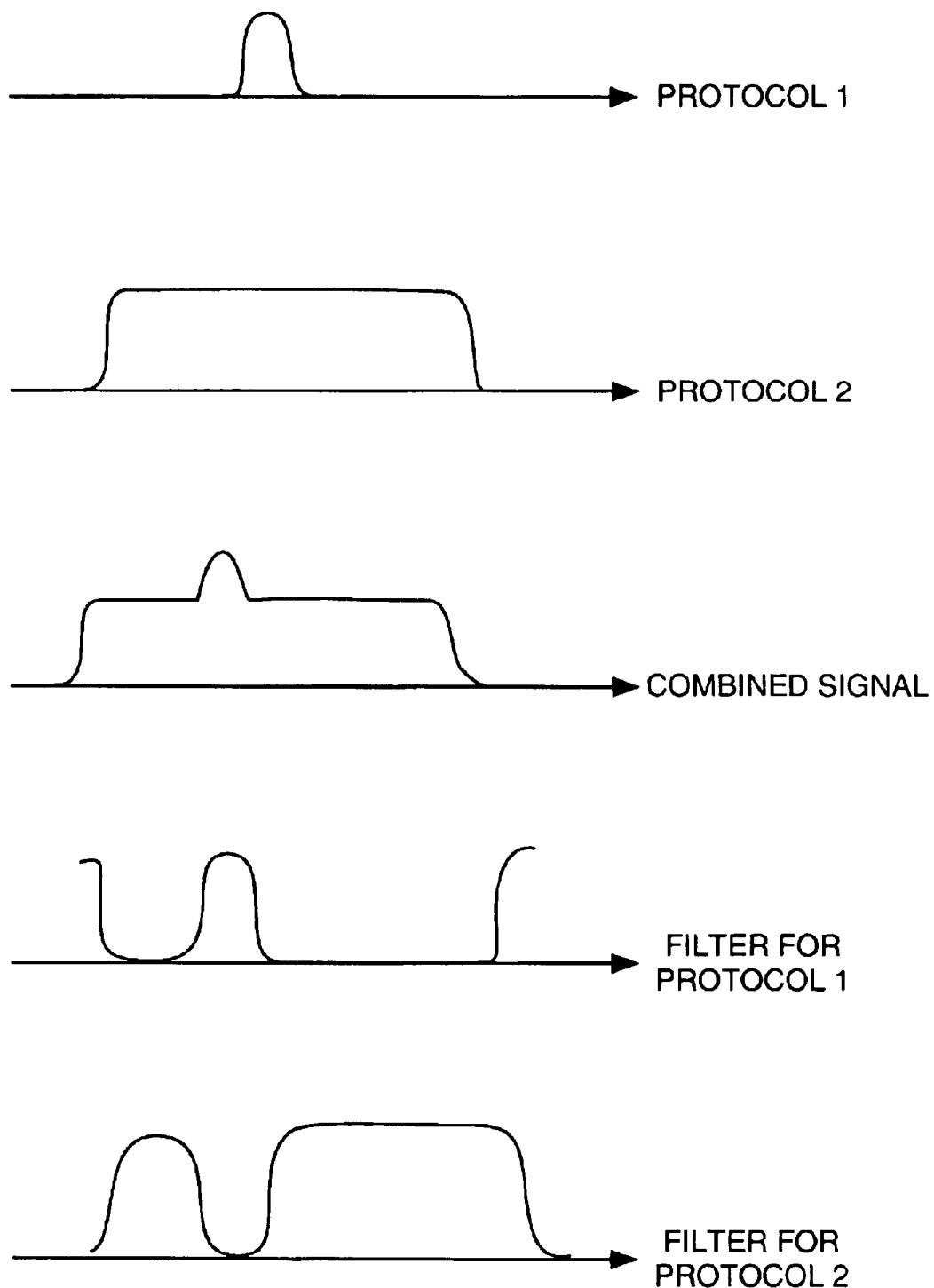
FIG. 7 illustrates the concept of a notch filter.

Receiver 1207 is used to additionally receive signals transmitted in accordance with the first protocol between wireless devices 104a, thus allowing the enhanced wireless devices 104b, to be able to receive signals in the first protocol, in addition to transmitting and receiving signals in the second protocol Interference resolution manager 1205 is equipped to determine at least a signaling characteristic of the first protocol, and predicts when an interference will occur, based on the determined one or more signal characteristics. For the illustrated embodiment, interference resolution manager 1205 determines the pseudo random frequency hopping pattern followed by devices 104a, and predicts when an interference will occur based on the determined pseudo random frequency hopping pattern. The determination may be made in any one of a number of techniques known in the art. Additionally, interference resolution manager 1205 further determines an appropriate filter to be applied to remove the interfering signals of wireless devices 104a at each predicted occurrence of interference. In one embodiment, the appropriate filter is a notch filter, inversely formed based on the interfering signal (as illustrated in FIG. 7).

Thus, as illustrated in FIG. 5b, upon power on or reset, interference resolution manager 1205 monitors the transmit signals of devices 104a to determine the pseudo random frequency hopping pattern followed by devices 104a, and the appropriate filter to apply, 1210. Thereafter, interference resolution manager 1205 determines if an interference is to occur, based on the determined pseudo random frequency hopping pattern, 1212. Whenever an interference is predicted to occur, interference resolution manager 1205 outputs the appropriate control signal and filtering information for controller manager 1206 to apply the appropriate filter to proactively remove the interfering signals of wireless devices 104a, 1214.

Except for the determination of the pseudo random frequency hopping pattern of wireless devices 104a, the determination of the appropriate filter, predicting when an interference will occur, and causing controller manager 1206 to apply the determined appropriate filter, each enhanced wireless device 104b, including controller manager 1206 and transceiver 1208, otherwise operates as known in the art.

Referring again to FIG. 5a, in one embodiment, in support of the "minimally enhanced" devices 104b, interference resolution manager 1205 further monitors signals received by transceiver 1208 from other devices 104b. In particular, interference resolution manager 1005 monitors for requests from other "minimally enhanced" devices 104b to be preemptively notified of a predicted occurrence of an interference. Upon receiving at least one such request, interference resolution manager 1205 further causes each prediction to be broadcast for other devices 104b, including the appropriate filter to apply, thereby allowing the "minimally enhanced" devices 104b to be able to also proactively resolve interference.

A "minimally enhanced" device 104b likewise may also be constituted by merely slightly modifying controller manager 1206. Controller manager 1206 is slightly modified to broadcast a request to "fully enhanced" devices 104b, to preemptively provide a prediction of interference, as described earlier. Again, the broadcast may be made e.g. at power on, reset, or periodically. Controller manager 1206 further causes the appropriate filter to be applied to received signals, whenever a prediction of an interference occurrence is received.

Figure 6A:
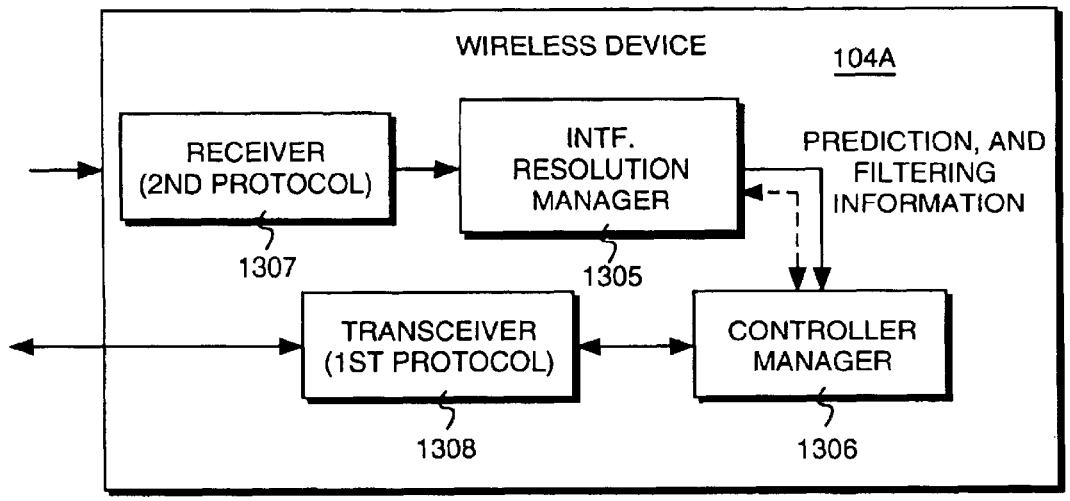
FIGS. 6a–6b illustrate an architectural view and operation flow of "fully" enhanced wireless devices 104a of FIG. 1 in further detail, in accordance with another implementation.
Figure 6B:
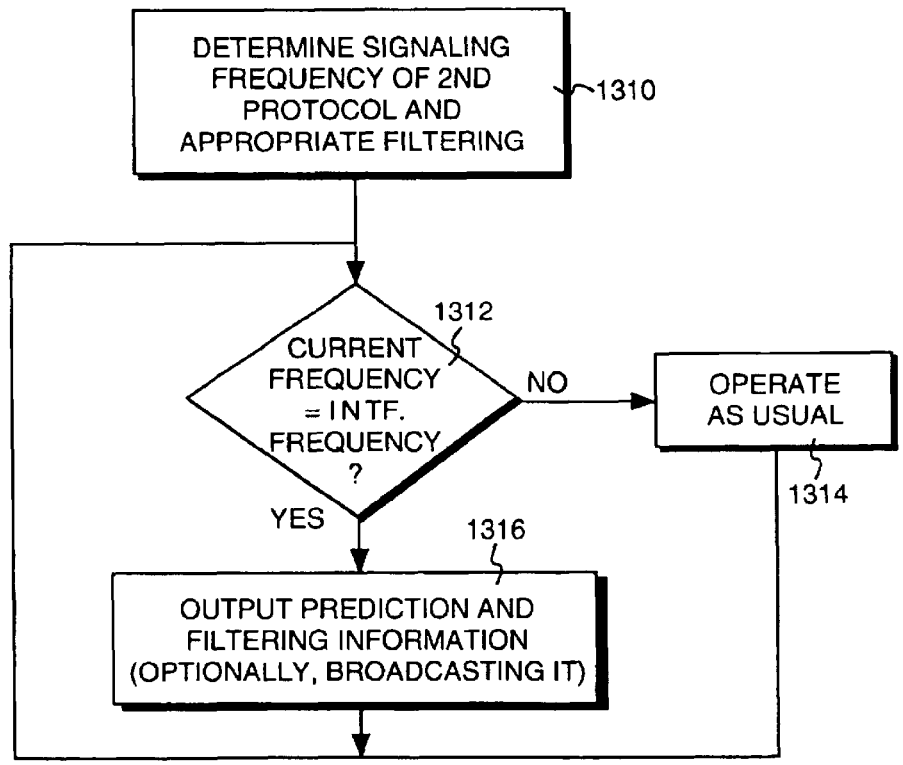

FIGS. 6a–6b illustrate the architecture and operational flow of an enhanced wireless device 104a of FIG. 1 for practicing the method of operation of FIG. 2c, in accordance with another embodiment (another "fully enhanced" embodiment). As described earlier, under the embodiment of FIG. 2c, wireless devices 104a are enhanced to proactively resolve interference. Enhanced wireless devices 104a are to predict when an interference will occur, and at each of such predicted occurrence, apply an appropriate filter (for a brief moment) to remove interfering signals of wireless devices 104b.

As illustrated in FIG. 6a, to enable wireless devices 104a to so operate, each wireless device 104a, in addition to conventional transceiver 1308 and controller manager 1306, is additionally provided with receiver 1307 and interference resolution manager 1305. The elements are coupled to each other as shown.

Receiver 1307 is used to additionally receive signals transmitted in accordance with the second protocol between wireless devices 104b, thus allowing the enhanced wireless device 104a, to be able to receive signals in the second protocol, in addition to transmitting and receiving signals in the first protocol. Interference resolution manager 1305 is equipped to determine at least a signaling characteristic of the second protocol, determine if an interference is to occur based on the determined one or more signal characteristics, and proactively avoid the interference. For the illustrated embodiment, interference avoidance manager 1105 determines the signaling frequency of the second protocol. Additionally, interference resolution manager 1305 further determines an appropriate filter to be applied to remove the interfering signals of wireless devices 104b at each predicted occurrence of interference. In one embodiment, the appropriate filter is also a notch filter, inversely formed based on the interfering signal (as illustrated in FIG. 7).

Thus, as illustrated in FIG. 6b, upon power on or reset, interference resolution manager 1305 monitors the transmit signals of devices 104b to determine the signaling frequency of devices 104b, and the appropriate filter to apply, 1310. Thereafter, interference resolution manager 1305 monitors the pseudo random frequency hopping pattern of controller manager 1306, and determines if the current frequency is the same as the signaling frequency of devices 104b, 1312. If the current frequency is not the interfering frequency, interference resolution manager 1305 allows controller manager 1306 to operate transceiver 1308 as known in the art, otherwise, interference resolution manager 1305 outputs the appropriate control signal, including the filtering information, to cause controller manager 1306 to apply the appropriate filter to the received signals, to proactively resolve interference, 1314.

Except for the inclusion of receiver 1307 and interference resolution manager 1305, each wireless device 104a, including controller manager 1106 and transceiver 1108, otherwise operates as known in the art.

Referring again to FIG. 6a, in one embodiment, in support of "minimally enhanced" devices 104a, interference resolution manager 1305 further monitors signals received by transceiver 1308 from other devices 104a. In particular, interference resolution manager 1305 monitors for requests from other "minimally enhanced" devices 104a to be preemptively notified of a "predicted" occurrence of an interference. Upon receiving at least one such request, interference resolution manager 1305 further causes each prediction to be broadcast for other devices 104a, thereby allowing the "minimally enhanced" devices 104a to also proactively resolve interference.

A "minimally enhanced" device 104a may likewise be constituted by merely slightly modifying controller manager 1306 (i.e., without providing receiver 1307 and interference manager 1305). Controller manager 1306 is slightly modified to broadcast a request to "fully enhanced" device 104a, to preemptively provide a prediction of interference and associated filtering information, as described earlier. Otherwise, controller manager 1307 operates substantially as described earlier, i.e. operating transceiver 1308 to transmit and receive signals as long as no prediction of an interference occurrence is received, and proactively filters received signals whenever a prediction of an interference occurrence is received.

Thus, wireless devices equipped to proactively avoid interference have been described. While the present invention has been described in terms of the above illustrated embodiments, those skilled in the art will recognize that the invention is not limited to the embodiments described. The present invention can be practiced with modification and alteration within the spirit and scope of the appended claims. For example, in each of the "filtering" embodiments, the appropriate filtering may be "recursively" or "incrementally" determined. As a further example, each of enhanced wireless devices 104a and 104b may be further enhanced to allow the pro-active interference avoidance/resolution function to be configurably enabled or disabled. The description is thus to be regarded as illustrative instead of restrictive on the present invention.

What is claimed is:

1. An apparatus comprising:
    a wireless transceiver to transmit and receive signals in accordance with a first protocol to and from first other apparatuses of a first wireless network;
    a wireless receiver to receive signals transmitted in accordance with a second protocol by second other apparatuses of a second wireless network; and
    a controller manager coupled to the wireless transceiver and receiver to control operation of the wireless transceiver based at least in part on one signaling characteristic of said received signals from said second other apparatuses of the second wireless network, to reduce interference with said second other apparatuses of the second wireless network.

2. The apparatus of claim 1, wherein said second protocol is a frequency hopping protocol comprising a plurality of frequencies employed in accordance with a pseudo random pattern, and the controller manager includes logic to ascertain the pseudo random frequency hopping pattern using said received signals from said second other apparatuses.

3. The apparatus of claim 2, wherein the controller manager further includes logic to predict when interference with said second other apparatuses of said second wireless network will occur, based on said ascertained pseudo random frequency hopping pattern.

4. The apparatus of claim 1, wherein said second protocol is a constant frequency protocol, and the controller manager includes logic to ascertain the constant frequency using said received signals from said second other apparatuses.

5. The apparatus of claim 4, wherein the controller manager further includes logic to predict when interference with said second other apparatuses of said second wireless network will occur, based on said ascertained constant frequency.

6. The apparatus of claim 1, wherein the controller manager further includes logic to suspend operation of said wireless transceiver to avoid interference with said second other apparatuses of said second wireless network, whenever an interference is predicted to occur.

7. The apparatus of claim 1, wherein the controller manager further includes logic to determine filtering to be employed, whenever an interference is predicted to occur, to cancel interfering signals from said second other apparatuses.

8. The apparatus of claim 7, wherein the controller manager includes logic to determine a notch filter, inversely formed in accordance with transmit signals of said second other apparatuses.

9. The apparatus of claim 7, wherein the controller manager includes logic to employ said filtering to cancel interfering signals of said second other apparatuses of said second wireless network, whenever an interference is predicted to occur.

10. The apparatus of claim 1, wherein the controller manager further includes logic to preemptively notify one or more of said first other apparatuses, an interference is predicted to occur.

11. The apparatus of claim 10, wherein the controller manager further includes logic to preemptively notify said one or more of said first other apparatuses, a selected one of suspending operation to avoid interference with said second other apparatuses and applying filtering to cancel interfering signals from said second other apparatuses.

12. The apparatus of claim 1, wherein the controller manager further includes logic to request one of said first other apparatuses to preemptively provide notification of a predicted occurrence of an interference with said second other apparatuses.

13. The apparatus of claim 1, wherein the first protocol is a protocol selected from a group of standards adopted prior to Nov. 12, 1999, consisting of IEEE 802.11(a), IEEE 802.11(b), and Home RF, and the second protocol is the Bluetooth protocol adopted prior to Nov. 12, 1999.

14. The apparatus of claim 1, wherein the first protocol is the Bluetooth protocol adopted prior to Nov. 12, 1999, and the second protocol is a protocol selected from a group of standards adopted prior to Nov. 12, 1990, consisting of IEEE 802.11(a), IEEE 802.11(b), and Home RF.

15. In a wireless apparatus having a wireless transceiver and a wireless receiver; a method of operation comprising:
(a) receiving signals transmitted in accordance with a first protocol by first other apparatuses of a first wireless network and predicting interference between signal transmission in accordance with the first protocol and a second protocol based on at least one determined signaling characteristic;
(b) determining at least one signaling characteristic of said received signals from said first other apparatuses; and
(c) operating said wireless transceiver to transmit and receive signals in accordance with said second protocol to and from second other apparatuses of a second wireless network, based on said at least one determined signaling characteristic of said received signals from said first other apparatuses, to reduce said predicted interference with proximately located ones of said first other apparatuses of the first wireless network.

16. The method of claim 15, wherein said first protocol is a frequency hopping protocol comprising a plurality of frequencies employed in accordance with a pseudo random pattern, and the method further comprises ascertaining the pseudo random frequency hopping pattern using said received signals from said first other apparatuses.

17. The method of claim 16, wherein the method further comprises predicting when interference with said first other apparatuses of said first wireless network will occur, based on said ascertained pseudo random frequency hopping pattern.

18. The method of claim 15, wherein said first protocol is a constant frequency protocol, and the method further comprises ascertaining the constant frequency using said received signals from said first other apparatuses.

19. The method of claim 18, wherein the method further comprises predicting when interference with said first other apparatuses of said first wireless network will occur, based on said ascertained constant frequency.

20. The method of claim 15, wherein the method further comprises suspending operation of said wireless transceiver to avoid interference with said first other apparatuses of said first wireless network, whenever an interference is predicted to occur.

21. The method of claim 13, wherein the method further comprises determining filtering to be employed, whenever an interference is predicted to occur, to cancel interfering signals from said first other apparatuses.

22. The method of claim 21, wherein the method further comprises determining a notch filter, inversely formed in accordance with transmit signals of said first other apparatuses.

23. The method of claim 21, wherein the method further comprises employing said filtering to cancel interfering signals of said first other apparatuses of said first wireless network, whenever an interference is predicted to occur.

24. The method of claim 15, wherein the method further comprises preemptively notifying one or more of said second other apparatuses, an interference is predicted to occur.

25. The method of claim 24, wherein the method further comprises preemptively notifying said one or more of said second other apparatuses, a selected one of suspending operation to avoid interference with said first other apparatuses and applying filtering to cancel interfering signals from said first other apparatuses.

26. The method of claim 15, wherein the method further comprises requesting one of said second other apparatuses to preemptively provide notification of a predicted occurrence of an interference with said first other apparatuses.

27. A collection of apparatuses comprising:
a first plurality of apparatuses equipped to communicate wirelessly in accordance with a first protocol; and
a second plurality of apparatuses equipped to communicate wirelessly in accordance with a second protocol, wherein at least one of the second plurality of apparatuses is further equipped to receive signals transmitted in said first protocol, and determine at least one signaling characteristics of said received signals transmitted in accordance with said first protocol, and predict interference between signal transmissions in accordance with said first protocol and said second protocol based on said at least one determined signaling characteristic and to reduce said predicted interference with proximately located one or ones of said first plurality of apparatuses based on said determined at least one signaling characteristics of said received signals transmitted in accordance with said first protocol.

28. The collection of apparatuses of claim 27, wherein the at least one of the second plurality of apparatuses includes logic to predict an interference with said first plurality of apparatuses is to occur.

29. The collection of apparatuses of claim 27, wherein the at least one of the second plurality of apparatuses includes logic to suspend transmit operation to avoid interference with said first plurality of apparatuses, whenever an interference with said first plurality of apparatuses is predicted to occur.

30. The collection of apparatuses of claim 27, wherein the at least one of the second plurality of apparatuses includes logic to applying filtering to cancel interfering signals of said first plurality of apparatuses, whenever an interference with said first plurality of apparatuses is predicted to occur.

* * * * *